(12) United States Patent
Aramaki et al.

(10) Patent No.: US 9,273,848 B2
(45) Date of Patent: Mar. 1, 2016

(54) LIGHT SOURCE UNIT HAVING REFLECTING SUBSTANCES WITH HIGHER AND LOWER REFLECTIVITY FOR LIGHT OF NON-VISIBLE LIGHT WAVELENGTHS AND IMAGE READING DEVICE

(71) Applicants: Tohru Aramaki, Tokyo (JP); Hiroshi Hasegawa, Tokyo (JP); Atsushi Itoh, Tokyo (JP); Toshiaki Shoji, Tokyo (JP)

(72) Inventors: Tohru Aramaki, Tokyo (JP); Hiroshi Hasegawa, Tokyo (JP); Atsushi Itoh, Tokyo (JP); Toshiaki Shoji, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 59 days.

(21) Appl. No.: 14/360,777

(22) PCT Filed: Dec. 25, 2012

(86) PCT No.: PCT/JP2012/083404
§ 371 (c)(1),
(2) Date: May 27, 2014

(87) PCT Pub. No.: WO2013/099836
PCT Pub. Date: Jul. 4, 2013

(65) Prior Publication Data
US 2014/0332667 A1    Nov. 13, 2014

(30) Foreign Application Priority Data

Dec. 27, 2011    (JP) .................................. 2011-286091

(51) Int. Cl.
*F21V 7/04* (2006.01)
*H04N 1/028* (2006.01)
*F21V 8/00* (2006.01)

(52) U.S. Cl.
CPC ................ *F21V 7/04* (2013.01); *G02B 6/0096* (2013.01); *H04N 1/02825* (2013.01); *H04N 1/02835* (2013.01); *H04N 1/02895* (2013.01)

(58) Field of Classification Search
CPC .... H01L 31/0547; G02B 5/208; G02B 13/14; F21V 7/04; F21V 7/22
USPC .............. 250/208.1, 556, 205, 221, 216, 235, 250/559.4, 552; 353/85, 98, 119, 73–77; 358/480–482; 362/606–615, 23.14, 21, 362/16
See application file for complete search history.

(56) References Cited

U.S. PATENT DOCUMENTS 5,739,879 A * 4/1998 Tsai ....................... G01D 11/28
349/62
2010/0046045 A1    2/2010    Nagao et al.

FOREIGN PATENT DOCUMENTS

CN            1752871 A    3/2006
CN          102106143 A    6/2011
(Continued)

OTHER PUBLICATIONS

Japanese Office Action issued May 27, 2014, in Japan Patent Application No. 2013-551690 (with English translation).
(Continued)

*Primary Examiner* — Que T Le
(74) *Attorney, Agent, or Firm* — Oblon, McClelland, Maier & Neustadt, L.L.P.

(57) ABSTRACT

The light source unit comprises a light source emitting visible light and light of a non-visible wavelength; a rod-like light guide at the end of which the light source is provided and within which incident light from the light source is propagated in the long axis direction; a reflector that is linear along the long axis direction and provided on the contour surface of the light guide; and a support member encompassing the reflector and light guide, having a given width in the direction perpendicular to the long axis direction, and provided with an opening extending along the long axis direction. The reflector and support member are formed by a reflecting material containing a substance reflecting the light of a non-visible light wavelength and reflecting the visible light and light of a non-visible light wavelength.

10 Claims, 9 Drawing Sheets

(56) References Cited

FOREIGN PATENT DOCUMENTS

| EP | 2 296 361 A1 | 3/2011 |
|---|---|---|
| JP | 8-94809 | 4/1996 |
| JP | 10 276298 | 10/1998 |
| JP | 2000-222908 A | 8/2000 |
| JP | 2001 229722 | 8/2001 |
| JP | 2009-284373 | 12/2009 |
| JP | 2010 45755 | 2/2010 |
| JP | 2010 50689 | 3/2010 |
| JP | 2011-154996 A | 8/2011 |
| JP | 2011 217241 | 10/2011 |
| WO | WO 2008/144656 A2 | 11/2008 |
| WO | WO 2008/144656 A3 | 11/2008 |

OTHER PUBLICATIONS

International Search Report Issued Apr. 2, 2013 in PCT/JP12/083404 Filed Dec. 25, 2012.
Extended European Search Report issued on Jun. 18, 2015 in European Patent Application No. 12861533.3.
Office Action mailed Nov. 10, 2015 in Japanese Patent Application No. 2014-210975 (with English Machine Translation).
Office Action mailed Oct. 23, 2015 in Chinese Patent Application No. 201280064628.7 (with English Translation).

* cited by examiner

LIGHT SOURCE UNIT HAVING REFLECTING SUBSTANCES WITH HIGHER AND LOWER REFLECTIVITY FOR LIGHT OF NON-VISIBLE LIGHT WAVELENGTHS AND IMAGE READING DEVICE

TECHNICAL FIELD

The present invention relates to a light source unit and image reading device.

BACKGROUND ART

Image reading devices are used in paper-like media reading/screening devices and industrial inspection devices. For example, image reading devices are used in reading mark sheets, banknotes, and checks, and the like.

For reading banknotes or checks, special print may be made on their surface. For example, some banknotes are printed with invisible ink reflecting only the infrared light (wavelengths of 750 nm and longer) so as to enable the authentication of real banknotes. For the same purpose, some banknotes are printed with invisible ink emitting fluorescence when irradiated with the ultraviolet light (wavelengths of 300 to 400 nm).

For reading a banknote or check on which special print is made, it is required to irradiate the banknote or check with the infrared or ultraviolet light in addition to the visible light (wavelengths of 400 to 750 nm) used in reading ordinary print, and read the reflected light or emitted fluorescence from the banknote or check.

In order to solve the above problem, Patent Literature 1 discloses an image reading device comprising multiple light sources emitting light of different wavelengths from each other. The image reading device of the Patent Literature 1 comprises a first light source, a first light guide making the light from the first light source emerge toward a reading target, a second light source, a second light guide making the light from the second light source emerge toward the reading target and provided in parallel to the first light guide, and a lens unit and light receiving means provided between the first and second light guides, wherein the first and second light sources emit light of different wavelengths.

Furthermore, Patent Literature 2 discloses an ultraviolet irradiation device used in ultraviolet irradiation for fluorescence emission. This ultraviolet irradiation device comprises an LED emitting ultraviolet light and a light guide transparent to the light emitted by the LED, wherein the light guide is made of an amorphous fluorine resin and a linear light emerges via the light guide.

Schemes of making light enter a light guide made of a resin containing light-scattering microparticles from the rear face or a lateral end face thereof have problems with the assurance of focal illuminance and/or with uniformity. Then, in the ultraviolet irradiation device of the Patent Literature 2, multiple ultraviolet-emitting LEDs are lined up at fixed intervals and the light from the LEDs enters an elongated light guide transparent to the ultraviolet light. According to the Patent Literature 2, the lights emitted from adjacent LEDs overlap with each other at the ends of the fan-shaped lights, whereby a linear light source having a uniform light distribution is provided.

CITATION LIST

Patent Literature

Patent Literature 1: Unexamined Japanese Patent Application Kokai Publication No. 2010-50689; and Patent Literature 2: Unexamined Japanese Patent Application Kokai Publication No. 2001-229722.

SUMMARY OF INVENTION

Technical Problem

However, even with an image reading device of which multiple light sources emit light of different wavelengths from each other, sufficient irradiation properties may not be obtained in some cases because the refractive index, transmittance, and reflectance of the light guide, reflecting plate, and the like differ between the visible light and non-visible light (such as the infrared or ultraviolet light) and therefore, the amount and beam profile of the non-visible light are different from those of the visible light.

Furthermore, also in the case of using an ultraviolet irradiation device, the amount of light is different from that of a visible light irradiation device and then, as described above, sufficient irradiation properties may not be obtained in some cases.

The present invention is invented to solve the above problem and an exemplary objective of the present invention is to provide a light source unit and image reading device with which irradiation properties readable with visible light and non-visible light are obtained.

Solution to Problem

In order to achieve the above objective, the light source unit according to the present invention comprises a light source emitting visible light and light of a non-visible light wavelength; a rod-like light guide at the end of which the light source is provided and in which incident light from the light source is propagated in the long axis direction; a reflector that is linear along the long axis direction and provided on the contour surface of the light guide; and a reflecting structure encompassing the reflector and light guide, having a given width in the direction perpendicular to the long axis direction, and provided with an opening extending along the long axis direction. The reflector and reflecting structure are formed by a reflecting material containing a substance that reflects light of a non-visible light wavelength and reflecting visible light and light of a non-visible light wavelength.

Advantageous Effects of Invention

With the light source unit and image reading device according to the present invention, irradiation properties readable with visible light and non-visible light can be obtained.

DESCRIPTION OF EMBODIMENTS

Embodiment 1

Figure 1:
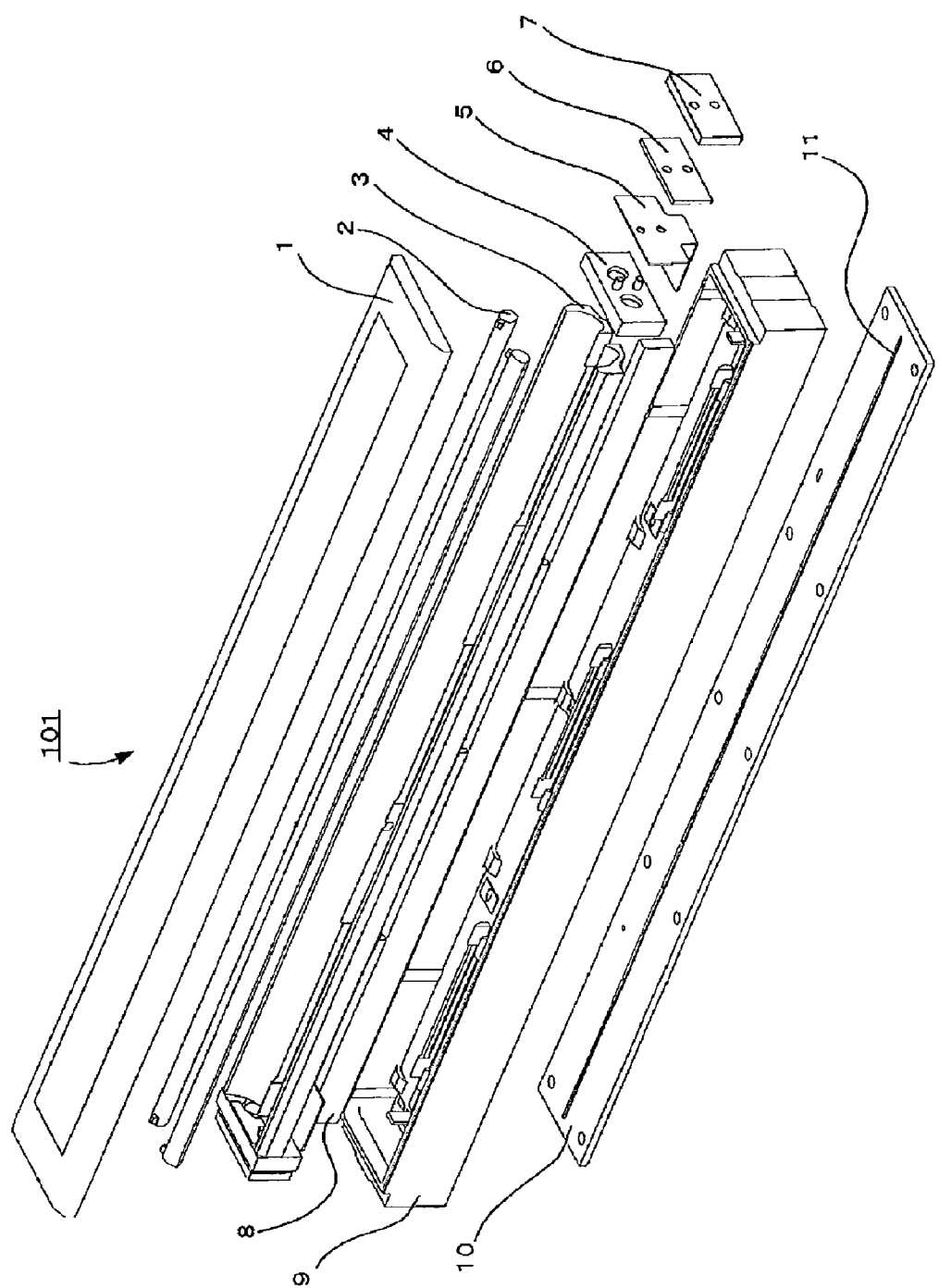
FIG. 1 is an exploded view for explaining the structure of the image reading device according to Embodiment 1 of the present invention.

Modes for implementing the present invention will be described in detail hereafter with reference to the drawings. In the figures, the same or equivalent components are referred to with the same reference numbers. FIG. 1 is an exploded view for explaining the structure of the image reading device according to Embodiment 1 of the present invention.

An image reading device 101 comprises, as shown in FIG. 1, a glass plate 1, light guides 2, support members 3, an LED (light emitting diode) substrate 5, a heat transfer sheet 6, a heat releasing plate 7, a lens 8, and a sensor substrate 10 having a sensor chip 11.

The light guides 2, LED substrate 5, heat transfer sheet 6, and heat releasing plate 7 are connected by a holder 4. More specifically, cylindrical through-holes and positioning pins are formed on the holder 4. The light guides 2 are fitted in the through-holes and the positioning pins are inserted in the through-holes of the LED substrate 5, heat transfer sheet 6, and heat releasing plate 7.

The support members 3 and lens 8 are housed in a frame 9 together with the light guides 2, LED substrate 5, and the like positioned on the holder 4. The frame 9 in which the components are housed is placed and assembled between the glass plate 1 and sensor substrate 10. The assembled image reading device 101 operates as follows.

Figure 2:
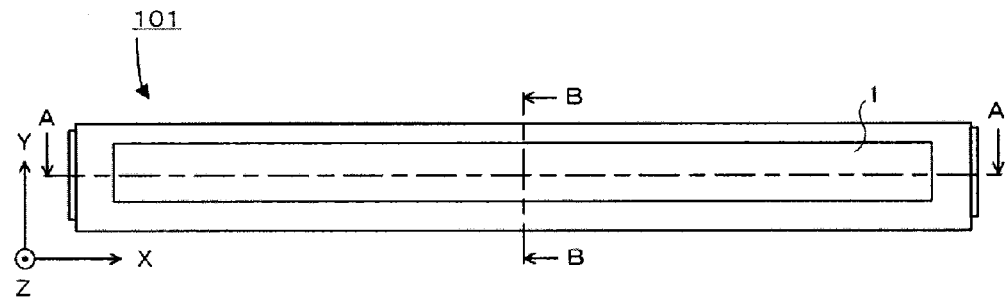
FIG. 2 is a plan view of the image reading device shown in FIG. 1 when seen from the glass plate side.
Figure 3:
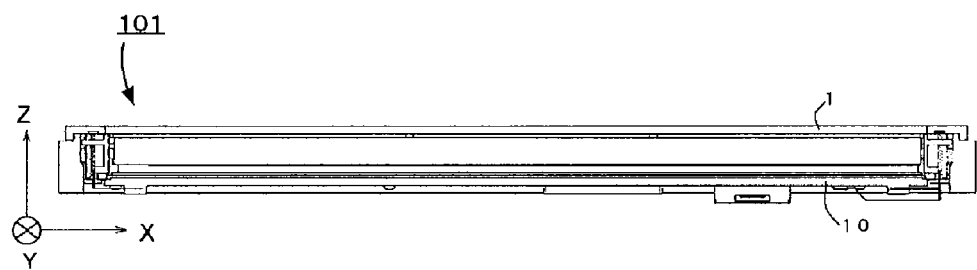
FIG. 3 is a cross-sectional view at A-A in FIG. 2.

FIG. 2 is a plan view of the image reading device shown in FIG. 1 when seen from the glass plate side. FIG. 3 is a cross-sectional view at A-A in FIG. 2. The image reading device 101 irradiates a reading target on the glass plate 1 shown in FIG. 1 with a linear beam extending in the main scan direction X while moving the reading target in the sub-scan direction Y. The light from the reading target is converged by the lens 8 comprising multiple cylindrical lenses arrayed in the main scan direction X, and received by the sensor chip on the sensor substrate 10 shown in FIG. 2.

The sensor chip is placed in the main scan direction X on the sensor substrate 10, and outputs pixel-based optical signals to the outside as electric signals. The sensor chip generates photovoltaic power according to received light and coverts optical energy to electric signals. As the sensor chip receives light from the reading target, the image reading device 101 reads the reading target as image data. The detailed structure of the image reading device 101 will be described hereafter.

Figure 4:
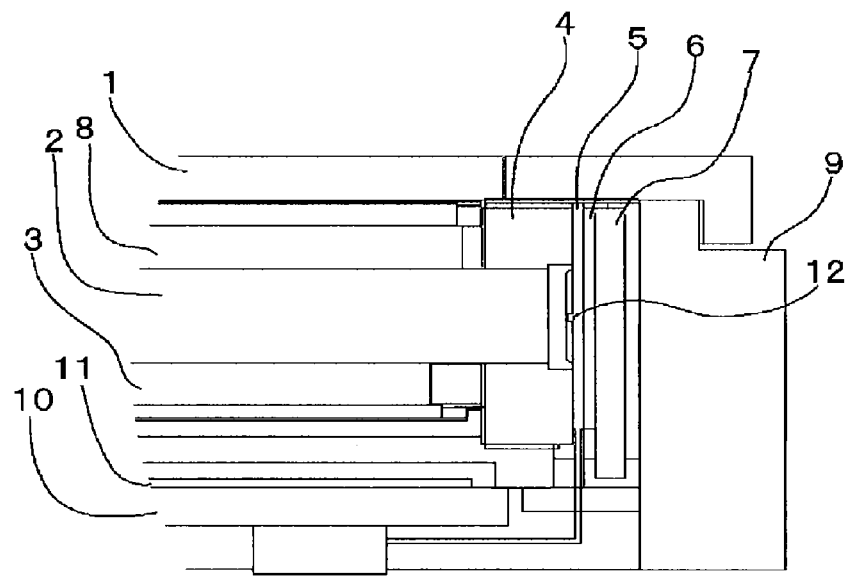
FIG. 4 is an enlarged view of the right end of the cross-section in FIG. 3.

FIG. 4 is an enlarged view of the right end of the cross-sectional view in FIG. 3. The LED substrate 5 shown in FIG. 4 is formed, for example, by a ceramic substrate, aluminum substrate, rigid flexible substrate, or the like in order to release heat generated while LED chips 12 are on. In order to release the heat of the LED chips 12 more efficiently, the heat transfer sheet 6 and heat releasing plate 7 are provided on one side of the LED substrate 5.

Multiple LED chips 12 are mounted on the opposite side of the LED substrate 5 to the side on which the heat transfer sheet 6 and heat releasing plate 7 are provided. More specifically, an LED chip 12 emitting visible light and an LED chip 12 emitting light of a non-visible light wavelength (light of a wavelength of the ultraviolet to infrared light) are mounted. The LED chip 12 emitting light of a non-visible light wavelength is, for example, an LED chip emitting ultraviolet light of a wavelength of approximately 365 nm or an LED chip emitting infrared light of a wavelength of approximately 940 nm. The former LED chip is used in the image reading device 101. The LED chips 12 function as the light source emitting visible light and light of a non-visible light wavelength.

The LED chips 12 face the end faces of the light guides 2. Therefore, as the LED chips 12 emit light, the light enters the light guides 2 from the end faces of the light guides 2.

The light guides 2 are preferably made of a material transmitting visible light and non-visible light (light of wavelengths of the ultraviolet to infrared light), and more preferably made of a material that does not easily deteriorate due to the ultraviolet light. Then, the image reading device 101 is capable of sufficient irradiation throughout a range from visible light to light of a non-visible light wavelength even though the LED chip 12 emitting visible light and the LED chip 12 emitting light of a non-visible light wavelength are mounted. Examples of the above material include cycloolefin polymer resin.

The light guides 2 have a rod-like cylinder shape. Entering from the cylinder end faces, the incident light from the LED chips 12 are totally reflected inside the light guides 2, and then the light propagates in the long axis direction of the cylinders, namely in the main scan direction. The propagated light is diffusely reflected and exits through the glass plate 1 as a linear beam extending in the main scan direction. Consequently, the light emitted by the LED chips 12 irradiates the reading target on the glass plate 1.

The light guides 2 are supported by the support members 3 supporting the cylindrical surfaces of the light guides 2 in part. The support members 3 have a reflecting layer allowing the light leaking from the light guides 2 to reenter the light guides 2, constituting the light source unit of the image reading device 101 together with the LED chips 12 and light guides 2.

Figure 5:
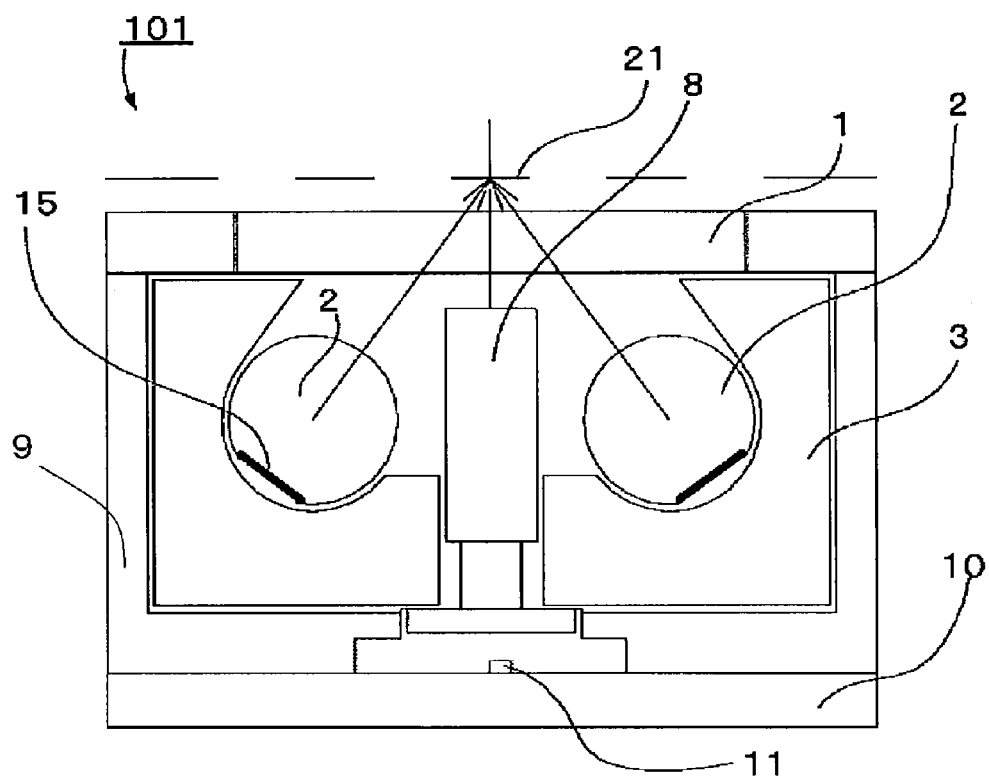
FIG. 5 is a cross-sectional view at B-B in FIG. 2.
Figure 6:
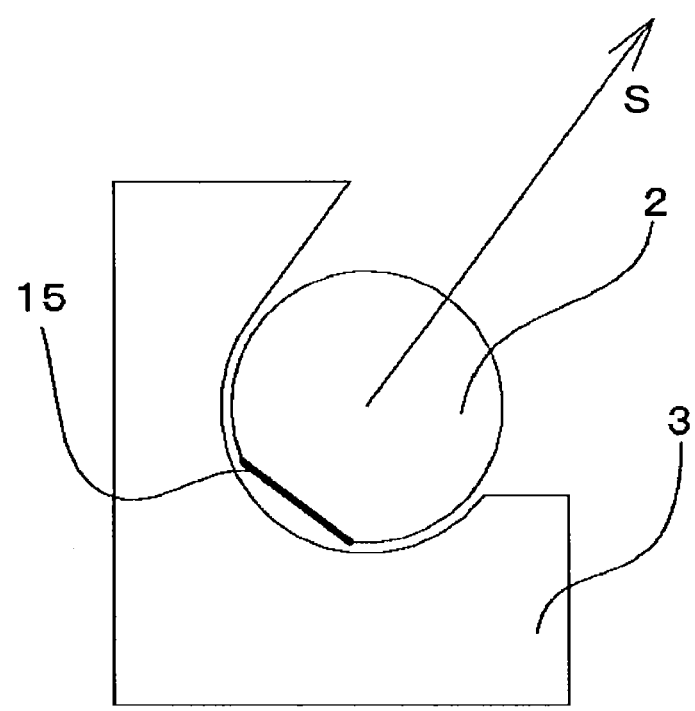
FIG. 6 is an enlarged view of the light source unit in FIG. 5.

FIG. 5 is a cross-sectional view at B-B in FIG. 2. FIG. 6 is an enlarged view of the light source unit in FIG. 5. The light guides 2 each have, as shown in FIGS. 5 and 6, a reflecting layer 15 that is linear along the long axis direction of the cylinder on the peripheral surface of the cylinder constituting the light guide 2 (which is also termed the printed reflecting pattern because the layer is formed by applying a reflector or reflecting material by printing).

The reflecting layer 15 is in the form of a flat plate having a given width in the direction perpendicular to the long axis direction of the light guide 2. Therefore, the light propagating within the light guide 2 in the long axis direction is reflected/scattered in the directions around the direction nearly perpendicular to the surface of the reflecting layer 15 (the direction S shown in FIG. 6). Since the reflecting layer 15 is linear, the reflected/scattered light emerges as a linear beam.

The light guides 2 and reflecting layers 15 are supported by the support members 3 (hereafter, the support members 3 are also termed the supports, or termed the reflecting structures because the support members 3 have a reflecting layer).

The support members 3 have a given width in the direction perpendicular to the long axis direction of the light guides 2 and have an opening extending along the long axis direction thereof. The opening has a curved surface nearly equal in shape to a part of the peripheral surface of the light guide 2. The curved surface encompasses and supports the part of the peripheral surface of the light guide 2 and the entire reflecting layer 15.

A reflecting layer is formed on the curved surface of the opening of the support member 3. This reflecting layer is formed on the entire curved surface of the opening encompassing the entire reflecting layer 15. Therefore, light that is not totally reflected within the light guide 2 and leaks to the support member 3 is reflected by the reflecting layer of the support member 3 and reenters the light guide 2. In this way, the reflecting layer of the support member 3 allows the image reading device 101 to use light more efficiently.

Figure 7:
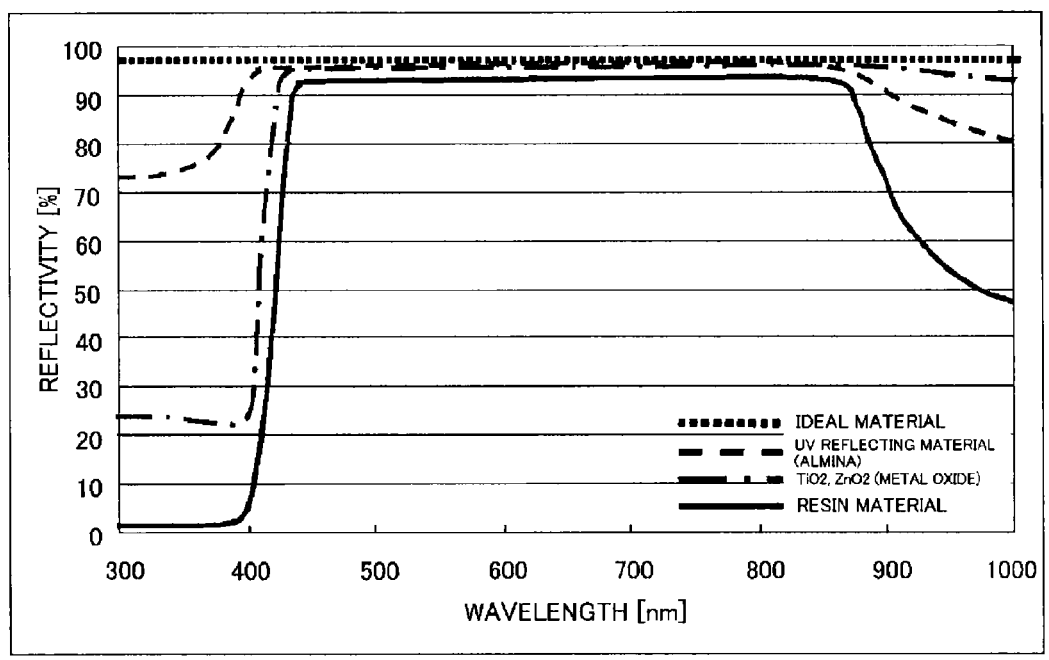
FIG. 7 is a graphical representation showing exemplary reflectivity of the substances constituting the reflecting layers of the support members according to Embodiment 1.

Since the LED chips 12 of the image reading device 101 emit visible light and light of a non-visible light wavelength, the reflecting layers of the support members 3 have to reflect visible light and light of a non-visible light wavelength. The same applies to the reflecting layers 15 of the light guides 2. Then, the reflecting layers of the support members 3 and the reflecting layers 15 of the light guides 2 are made of a reflecting material containing a substance reflecting light of a non-visible light wavelength, namely a substance having a higher reflectivity for light of a non-visible light wavelength than conventional substances used as a reflecting material (resin, metal, and the like), and reflecting visible light and light of a non-visible light wavelength. The reflecting layers of the support members 3 will be described hereafter by way of example. FIG. 7 is a graphical representation showing exemplary reflectivity of the substances constituting the reflecting layers of the support members according to Embodiment 1 of the present invention.

Of the light of wavelengths of 300 to 1000 nm shown in FIG. 7, when a light source emitting light of multiple ranges of wavelengths different from each other, for example, a light source emitting light of wavelengths of ultraviolet and visible light, a light source emitting light of wavelengths of visible and infrared light, or a light source emitting light of wavelengths of ultraviolet, visible, and infrared light is used in an image reading device, an ideal material is a material exhibiting a uniform reflectivity for all of the multiple ranges of wavelengths ("IDEAL MATERIAL" shown in FIG. 7). With such a material, light of a nearly uniform intensity throughout the multiple ranges of wavelengths emerges and the light is efficiently used. Then, it is possible to provide an image reading device with which sufficient irradiation properties are obtained even if the reading target is, for example, a banknote or check printed with invisible ink reflecting only the infrared light or with invisible ink emitting fluorescence under the ultraviolet light.

On the other hand, in the case of a resin material shown in FIG. 7 or a conventional reflecting ink material, the reflectivity to light of non-visible light wavelengths (for example, light in the ultraviolet or infrared range) is lower than the reflectivity in the visible light range ("RESIN MATERIAL" shown in FIG. 7). Therefore, such a material alone cannot sufficiently reflect the ultraviolet or infrared light. If the reflecting layers 15 of the light guides 2 or the reflecting layers of the support members 3 are made of such a material, sufficient irradiation properties cannot be obtained in the ultraviolet or infrared region.

For improving the irradiation properties, the reflecting layers 15 of the light guides 2 or the reflecting layers of the support members 3 are preferably made of a reflecting material to which a substance exhibiting a high reflectivity to light of a non-visible light wavelength (for example, light in the ultraviolet or infrared range) is added, for example a reflecting material reflecting light of a non-visible light wavelength more than the above-stated resin material or reflecting ink material. Such a material can improve the reflectivity of a substance exhibiting a low reflectivity to light of a non-visible light wavelength in the intended wavelength range, and the light of the light source unit can be used more efficiently.

For example, the reflecting layers 15 of the light guides 2 or the reflecting layers of the support members 3 are made of a resin material or reflecting ink material to which metal oxide (titanium oxide, zinc oxide, and the like) and ceramics (aluminum and the like) are added alone or in combination.

More specifically, the reflecting layers 15 of the light guides 2 and the reflecting layers of the support members 3 are made of, as shown in FIG. 7, a reflecting material containing alumina exhibiting a reflectivity of 73% or higher to light of a wavelength of 300 nm (73% or higher reflectivity to ultraviolet light of wavelengths of 300 to 400 nm) and a reflectivity of 90% or higher to light of a wavelength of 900 nm (80% or higher reflectivity to infrared light of wavelengths of 900 to 1000 nm) as a pigment in a resin material ("UV REFLECTING MATERIAL (ALMINA)" shown in FIG. 7).

Alternatively, the reflecting layers of the light guides 2 and the reflecting layers of the support member 3 are made of, as shown in FIG. 7, a reflecting material containing $TiO_2$ and $ZnO_2$ exhibiting a reflectivity of 24% or higher to light of a wavelength of 300 nm (22% or higher reflectivity to ultraviolet light of wavelengths of 300 to 400 nm) and a reflectivity of 96% or higher to light of a wavelength of 900 nm (93% or higher reflectivity to infrared light of wavelengths of 900 to 1000 nm) as a pigment in a resin material (see "$TiO_2$, $ZnO_2$ (METAL OXIDE)" shown in FIG. 7). This pigment can contain the above alumina along with $TiO_2$ and $ZnO_2$.

The resin material (acrylic resin) shown in FIG. 7 exhibits only a reflectivity of lower than 3% to light of a wavelength of 300 nm (reflectivity of lower than 3% to ultraviolet light of wavelengths of 300 to 400 nm) and a reflectivity of 70% to light of a wavelength of 900 nm (reflectivity of 47% or higher to infrared light of wavelengths of 900 to 1000 nm). However, with the addition of the above materials as a pigment, the reflectivity in the above ultraviolet and infrared ranges can be improved.

Examples of the resin material to which alumina and $TiO_2$/$ZnO_2$ are added as a pigment include, in addition to acrylic resin, cellulosic resin, melamine resin, vinyl resin, phenol resin, and ester resin. Additionally, the resins containing a white pigment (calcium carbonate, aluminum silicate, and the like) in the above resins are also included.

The reflecting layers 15 of the light guides 2 in this embodiment are formed by adding a metal oxide and ceramic to a reflecting ink material and applying the pigment-added reflecting ink material by printing. The reflecting ink material is a material called a white ink and, for example, a, material obtained by adding a white pigment such as calcium carbonate, aluminum silicate, and barium sulfate and an organic solvent (for example, toluene) for adjusting the viscosity to acrylic resin, ketone resin, or the like.

The reflecting layers of the support members 3 in this embodiment are formed by adding a metal oxide and ceramic to a resin material and applying the resin material to the surfaces of the support members 3. The resin material includes white resin. The white resin is, for example, a material obtained by adding the above-mentioned white pigment to acrylic resin.

As described above, the reflecting layers 15 of the light guides 2 and the reflecting layers of the support members 3 are formed so as to contain a substance preferably reflecting 24% or more of the light of a wavelength of 300 nm or 90% or more of the light of a wavelength of 900 nm, and more preferably reflecting 73% or more of the light of a wavelength of 300 nm or 96% or more of the light of a wavelength of 900 nm. Therefore, the reflecting layers 15 of the light guides 2 and the reflecting layers of the support members 3 exhibit high reflectance in the ultraviolet or infrared range. Then, the light source unit of the image reading device 101 enables irradiation with visible light and light of a non-visible light wavelength both sufficient in amount. Hence, the image reading device 101 is capable of highly accurate reading with both visible light and light of a non-visible light wavelength.

In Embodiment 1, the light guides 2 are explained in the form of a circular cylinder, for example. This is not restrictive. For example, the light guides 2 of the image reading device 101 can be in the form of an elliptic cylinder.

In Embodiment 1, the reflecting layers of the support members 3 are formed on the entire curved surface of the opening. For example, the reflecting layers can be formed on a part of the opening facing the reflecting layer 15 of the light guide 2 (a linear form along the long axis of the light guide 2).

Embodiment 2

Figure 8:
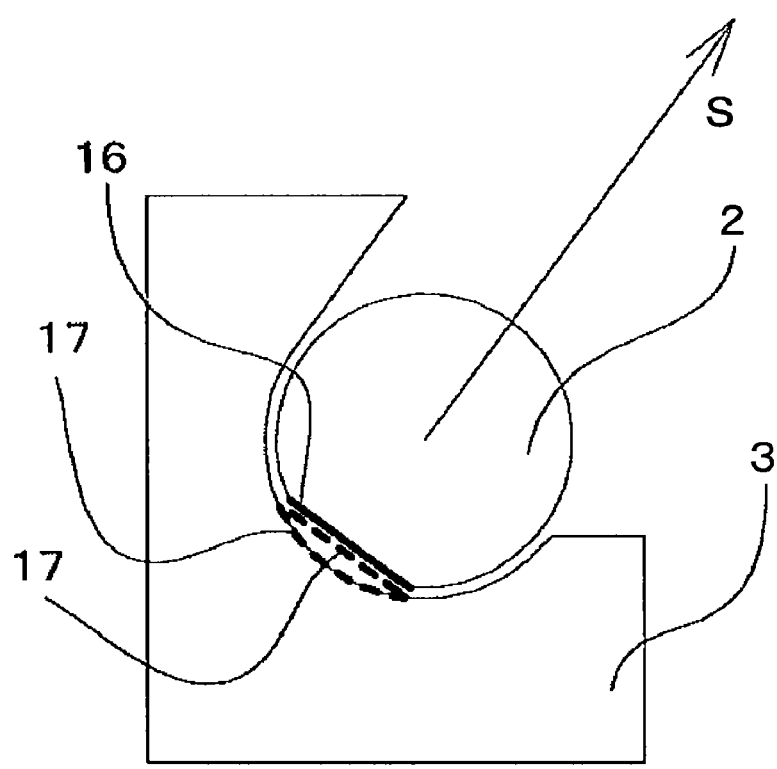
FIG. 8 is a cross-sectional view for explaining the structure of the light source unit according to Embodiment 2 of the present invention.

The light source unit according to Embodiment 2 is a light source unit utilizing a reflecting prism 16 (also termed a prism-reflecting pattern). FIG. 8 is a cross-sectional view for explaining the structure of the light source unit according to Embodiment 2 of the present invention. In FIG. 8, the letter S indicates the scattering direction (emerging direction) of light.

As shown in FIG. 8, the light source unit according to Embodiment 2 has a reflecting prism 16 reflecting the light propagating in the long axis direction from the LED chip 12.

Like the reflecting layer 15 in Embodiment 1, the reflecting prism 16 is linear in the long axis direction on the peripheral surface of the cylinder constituting the light guide 2. Therefore, the light propagating within the light guide 2 in the long axis direction is reflected and scattered by the reflecting prism 16 and exits in the direction nearly perpendicular to the long axis direction (the direction S shown in FIG. 8) as a linear beam.

The reflecting prism 16 reflects the light propagating within the light guide 2 due to optical refraction. Because the refractive index varies depending on the wavelength of light, visible light and non-visible light (light of wavelengths from the ultraviolet to infrared range) are not even in amount and distribution of light. Therefore, for example, the ultraviolet or infrared light is not reflected sufficiently and sufficient irradiation properties may not be obtained in the ultraviolet or infrared range.

In consideration for the above, in Embodiment 2, the reflecting prism 16 and support member 3 each have a second reflecting layer 17 (the second reflecting layer 17 is also termed a reflecting material or a highly reflecting ink).

The second reflecting layer 17 is formed on the surface of the reflecting prism 16 or on the curved surface of the opening of the support member 3. The second reflecting layer 17 is made of, as in Embodiment 1, a reflecting material containing a substance reflecting light of a non-visible light wavelength and reflecting visible light and light of a non-visible light wavelength. For example, the second reflecting layer 17 is formed by applying a white ink containing a metal oxide and/or ceramic as a pigment. Therefore, the light source unit of Embodiment 2 can irradiate a reading target with a sufficient amount of ultraviolet or infrared light.

In this embodiment, the reflecting prism 16 and support member 3 have the second reflecting member 17. It is possible that only one of the reflecting prism 16 and support member 3 has the second reflecting member 17.

Embodiment 3

Figure 9:
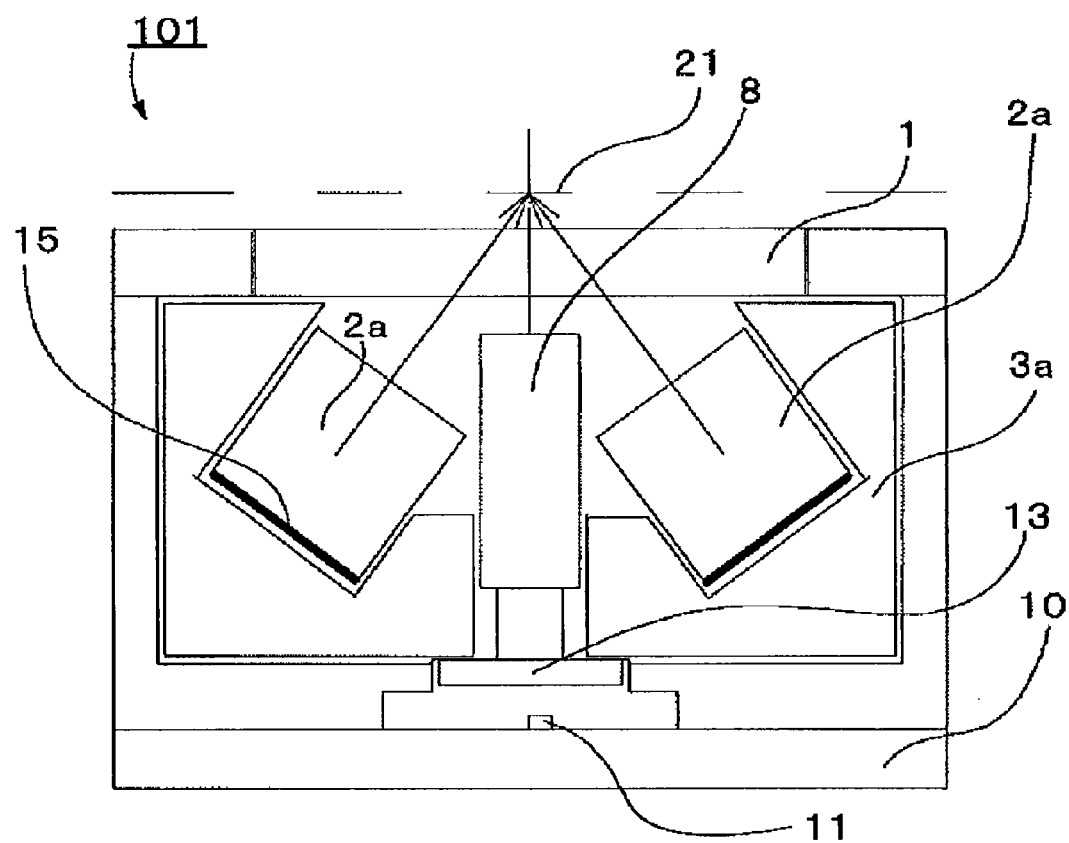
FIG. 9 is a cross-sectional view in the sub-scan direction of the image reading device according to Embodiment 3 of the present invention.
Figure 10:
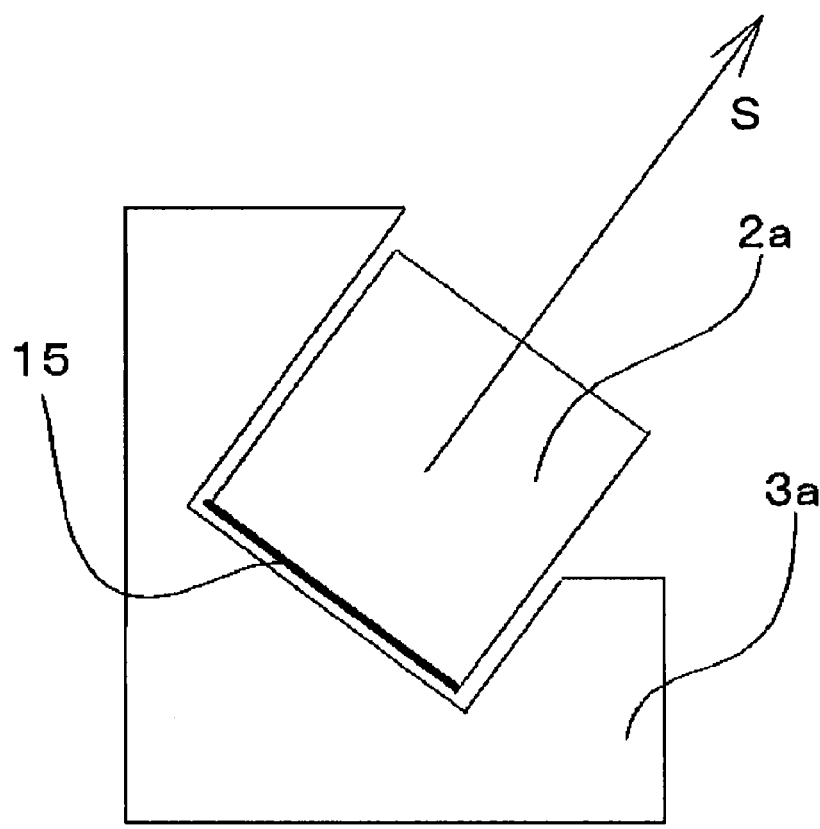
FIG. 10 is a cross-sectional view for explaining the structure of the light source unit according to Embodiment 3.

The image reading device according to Embodiment 3 is an image reading device utilizing the light guides having a rectangular cross-section. FIG. 9 is a cross-sectional view in the sub-scan direction of the image reading device according to Embodiment 3 of the present invention. FIG. 10 is a cross-sectional view for explaining the structure of the light source unit according to Embodiment 3. In FIGS. 9 and 10, the letter S indicates the scattering direction (emerging direction) of light.

The image reading device 101 comprises, as shown in FIGS. 9 and 10, light guides 2a having a rectangular cross-section and support members 3a each having an opening in which the light guide 2a having a rectangular cross-section can be housed.

The light guide 2a is provided with a reflecting layer 15 on the base side against the support member 3a among the sides of the rectangular cross-section. The reflecting layer 15 of the light guide 2a is formed on the entire base side, and made of the same material and formed by the same method as in Embodiment 1. Therefore, the light propagating within the light guide 2a is reflected and scattered by the reflecting layer 15 on the base side and exits in the direction opposite to the base side as a linear beam.

The support member 3a has an opening in the form of a rectangular parallelepiped to support the lateral sides and base side of the light guide 2a having a rectangular cross-section. The same reflecting layer as in Embodiment 1 is formed on the bottom of the opening to reflect light leaking from the light guide 2a.

Also in Embodiment 3, the reflecting layers 15 of the light guides 2a and the reflecting layers of the support members 3a have the same effect, whereby the image reading device 101 can irradiate a reading target with a sufficient amount of ultraviolet or infrared light.

Here, the image reading device 101 can be provided with an optical filter limiting the incident light to the sensor chip 11. For example, a UV cutoff filter 13 can be provided between the sensor chip 11 and lens 8 so that the sensor chip 11 is not irradiated with ultraviolet light while reading fluorescence under ultraviolet light.

Embodiment 4

Figure 11:
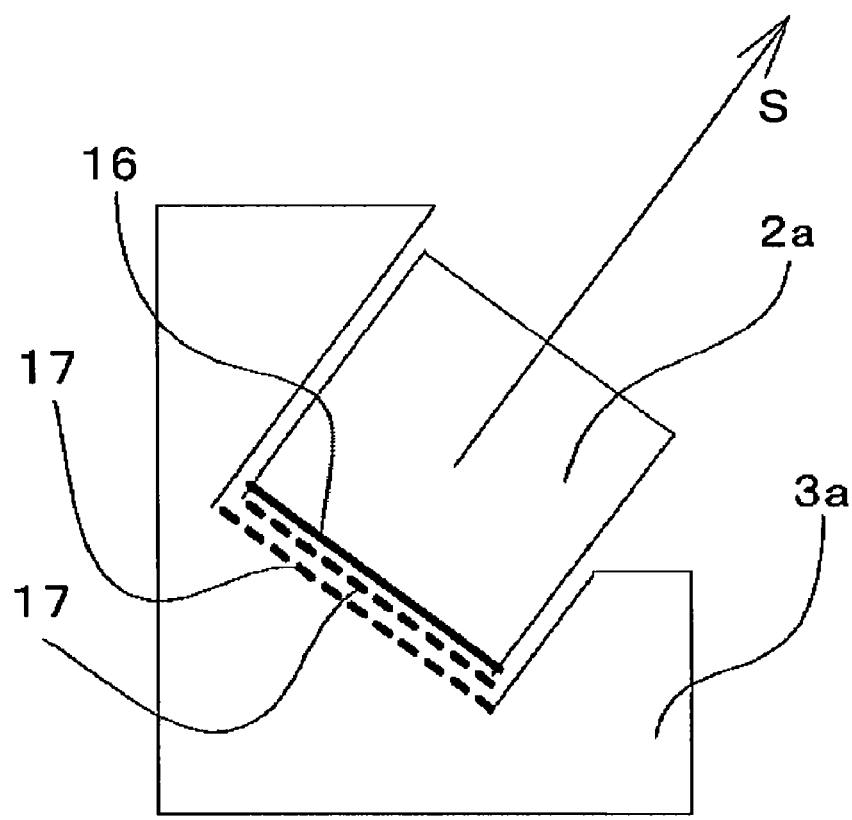
FIG. 11 is a cross-sectional view for explaining the structure of the light source unit according to Embodiment 4 of the present invention.

The light source unit according to Embodiment 4 is a light source unit utilizing light guides 2a having a rectangular cross-section and having a reflecting prism 16. FIG. 11 is a cross-sectional view for explaining the structure of the light source unit according to Embodiment 4 of the present invention.

The light source unit shown in FIG. 11 comprises a light guide 2a having a rectangular cross-section. The light guide 2a has a reflecting prism 16 provided on the base side of the rectangular cross-section.

The reflecting prism 16 has a second reflecting layer 17 on a surface as in Embodiment 2. The second reflecting layer 17 is made of the same material and formed by the same method as in Embodiment 2. In other words, the second reflecting layer 17 is formed by applying a white ink containing a metal oxide and/or ceramic as a pigment onto the reflection prism 16.

The support member 3a has an opening in the form of a rectangular parallelepiped to support the lateral sides and base side of the light guide 2a having a rectangular cross-section. The second reflecting layer 17 formed by applying a white ink containing a metal oxide and/or ceramic as a pigment is provided on the bottom of the opening as in Embodiment 2. Therefore, the light source unit according to Embodiment 4 also can irradiate a reading target with a sufficient amount of ultraviolet or infrared light.

Embodiments of the present invention are described above. The present invention is not restricted to the above-described embodiments. For example, in the above embodiments, the reflecting layers 15 of the light guides 2 or the reflecting layers of the support members 3 are formed by application. For example, it is possible to attach a sheet formed by a resin material to which a metal oxide or ceramic is added to the light guides 2 or support members 3 to form a reflecting layer.

Furthermore, in this embodiment, the LED chips 12 are mounted directly on the LED substrate 5. It is possible to mount a package in which the LED chips 12 are mounted on the LED substrate 5.

The above-described embodiments can be modified in various manners within the scope of gist of the present invention. The above-described embodiments are given for explaining the present invention and do not intend to confine the scope of the present invention. The scope of the present invention is set forth by the attached scope of claims, not by the embodiments. Various modifications made within the scope of claims and the scope equivalent to the claims of the present invention are considered to fall under the scope of the present invention.

This application claims the priority based on Japanese Patent Application No. 2011-286091, filed on Dec. 27, 2011 and including the specification, scope of claims, drawings, and abstract. The entire disclosure of this basic patent application is incorporated herein by reference.

REFERENCE SIGNS LIST

101 Image reading device
1 Glass plate
2, 2a Light guide
3, 3a Support member
4 Holder
5 LED substrate
6 Heat transfer sheet
7 Heat releasing plate
8 Lens
9 Frame
10 Sensor substrate
11 Sensor chip
12 LED chip
13 UV cutoff filter
15 Reflecting layer
16 Reflecting prism
17 Second reflecting layer
21 Reading target

The invention claimed is:
1. A light source unit, comprising:
a light source emitting visible light and light of a non-visible light wavelength;
a rod-like light guide at the end of which the light source is provided and in which incident light from the light source is propagated in a long axis direction;
a reflector that is linear along the long axis direction and provided on the contour surface of the light guide; and
a reflecting structure encompassing the reflector and the light guide, having a given width in the direction perpendicular to the long axis direction, and provided with an opening extending along the long axis direction,
wherein the reflector and reflecting structure are formed by a reflecting material containing a first reflecting substance that reflects visible light and light of a non-visible light wavelength, having a lower reflectivity for light of non-visible light wavelengths than reflectivity for visible light, and a second reflecting substance having a higher reflectivity for light of a non-visible light wavelength than the first substance.
2. The light source unit according to claim 1, wherein the reflector is a reflecting layer formed on a part of the contour surface of the light guide.
3. The light source unit according to claim 1, wherein the reflector is a reflecting prism provided on a part of the contour surface of the light guide.
4. The light source unit according to claim 1, wherein the second reflecting substance reflects 24% or more of the light of a wavelength of 300 nm or 90% or more of the light of a wavelength of 900 nm.
5. The light source unit according to claim 1, wherein the second reflecting substance reflects 73% or more of the light of a wavelength of 300 nm or 96% or more of the light of a wavelength of 900 nm.
6. The light source unit according to claim 1, wherein the reflector is formed by applying the reflecting material or attaching a sheet containing the reflecting material, and
the reflecting structure is formed by applying the reflecting material or attaching a sheet containing the reflecting material.
7. The light source unit according to claim 1, wherein the second reflecting substance contains at least a metal oxide.
8. The light source unit according to claim 1, wherein the second reflecting substance contains at least a ceramic.
9. The light source unit according to claim 1, wherein the light guide has a circular, elliptical, or rectangular cross-section in a place perpendicular to the long axis direction.
10. An image reading device, comprising:
the light source unit according to claim 1;
a lens body converging the light emitted by the light source unit and reflected by an irradiated object;
a light receiver receiving the light converged by the lens body; and
an enclosure housing the light source unit, lens body, and light receiver.

* * * * *